March 4, 1969  D. E. STRICKER  3,430,456
EXTENSION UNIT FOR AUGER
Filed July 10, 1967  Sheet 1 of 2
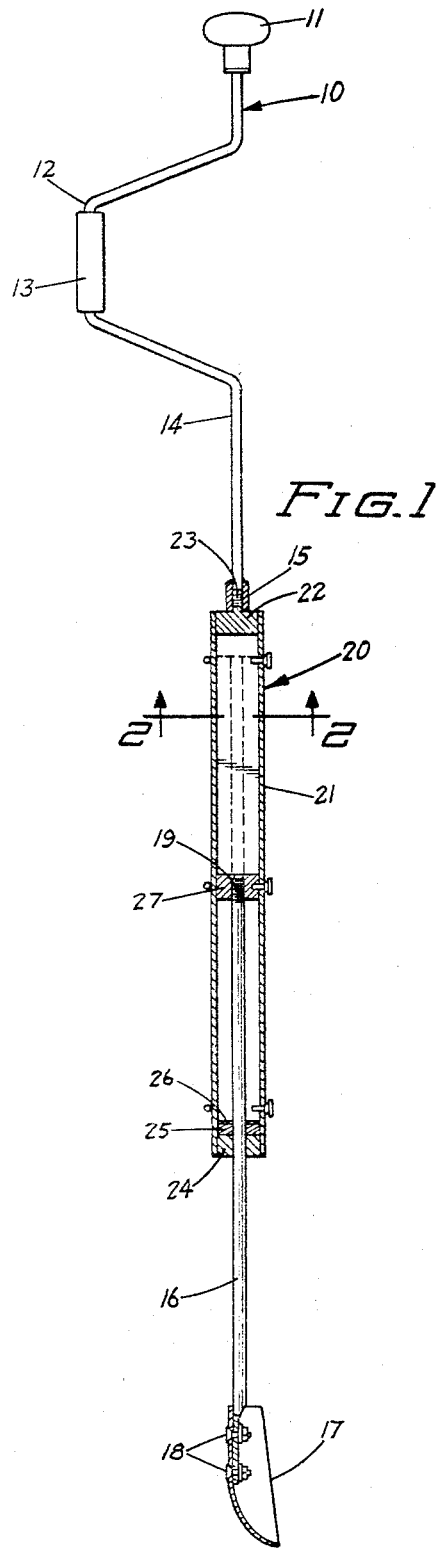
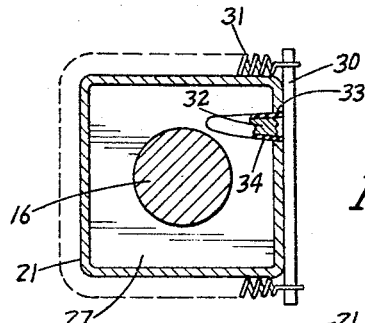
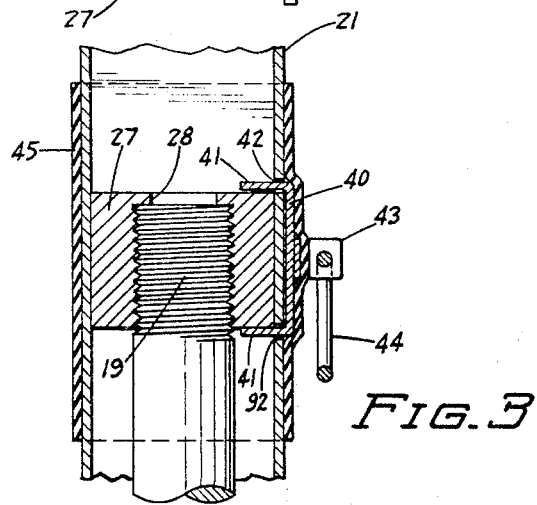
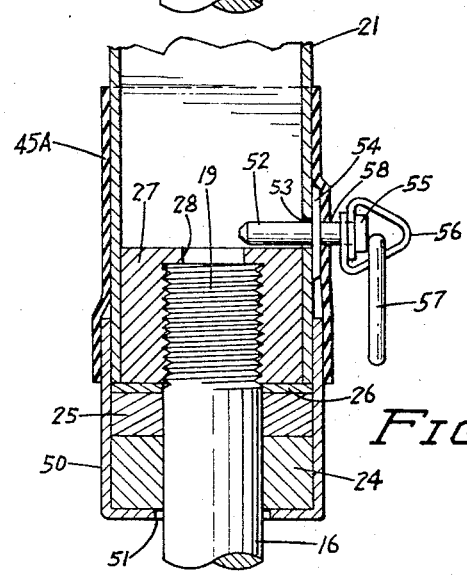
INVENTOR.
DONALD E. STRICKER
BY
Burd, MacEachron, Braddock,
Bartz & Schwartz
ATTORNEYS

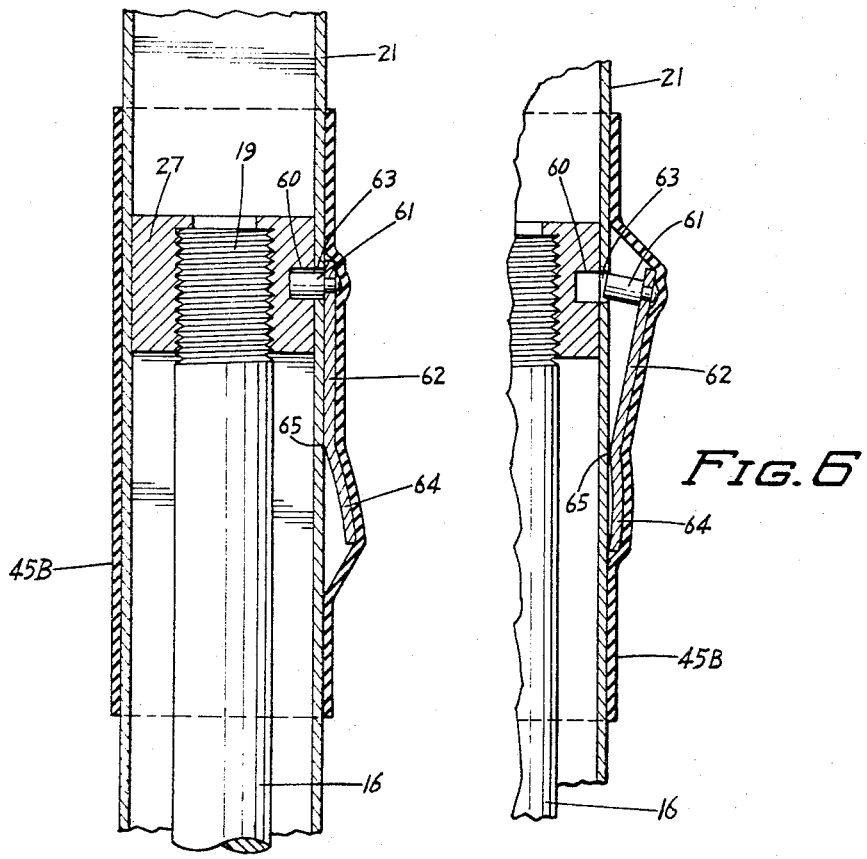

United States Patent Office 3,430,456
Patented Mar. 4, 1969

3,430,456
EXTENSION UNIT FOR AUGER
Donald E. Stricker, Rte. 1, St. Paul, Minn. 55111
Filed July 10, 1967, Ser. No. 652,084
U.S. Cl. 64—1                        10 Claims
Int. Cl. F16c 1/00, 3/00; F16b 7/10

ABSTRACT OF THE DISCLOSURE

A telescopic extension unit for an ice auger or similar hole drilling tool to permit progressive extension of the auger shank as the hole being cut is deepened. The end of the auger shank is secured in a slidable retainer contained within a tubular housing and rotatable therewith. Latching means are provided at spaced intervals along the length of the housing to lock the retainer and auger at any of several given positions relative to the housing while permitting operation of the auger at each of the latched positions, each representing an increment of increased length of the auger assembly.

---

This invention relates to a telescoping extension unit for increasing the effective length of augers, such as those used by ice fishermen to cut holes for winter fishing through the ice on lakes and streams, post hole diggers and the like. The extension unit is particularly adapted for use with ice augers and will be described in this application with particular reference to ice augers, but it is to be understood that its utility is not so limited.

In most northern regions of the world extensive winter fishing is carried on, either for sport or out of necessity to obtain food. The fisherman selects an appropriate lake or stream, cuts a hole through the ice using an auger or similar tool and then drops his lines through that hole. A number of commercial ice augers are available for this purpose. They all have a number of elements in common including an elongated shank with a cutting element at one end and operating means at the other. Typically, the shank between the cutting element and operating means is about three to four feet long. Usually some means of separating the auger is provided to facilitate breakdown of the auger for ease in carrying and storage. Typically, this separation is by means of a threaded collar or sleeve on the operating means end of the shank adapted to receive the externally threaded end of the shank carrying the cutting element at its opposite end.

A variety of different cutting elements are used, including a scoop-like cutting blade, spiral auger bit, etc. Most ice augers are intended for manual operation, although motor power may be used. Typically, the manual operating means is in the form of a T-bar or a brace or bit stock.

The hole through the ice is cut as a result of the force exerted from the top of the auger combined with rotary motion. As the ice is penetrated, the whole unit is lowered. So long as the ice being penetrated is no more than about two feet thick or so, this can be done reasonably conveniently with the augers available. If the ice is thicker than this, then it is necessary for the fisherman to get down on his hands and knees in order to effectively operate the auger. Then, when the ice is penetrated, there is likely to be a surge of water up through and around the hole soaking the knees and legs of the fisherman. It must be kept in mind that these units are almost always used under sub-freezing conditions and in the presence of water, creating a freezing and icing problem. If the ice is extremely thick, and five feet is not unusual in many areas, an auger whose total shank length is only four feet simply will not penetrate it at all.

The principal object of the present invention, therefore, is to provide a telescoping extension unit for augers by which the effective length of the auger may be increased in stages as necessary to cut deeper holes.

A further object is to provide an extension unit adapted for use with conventional augers for extending their effective lengths without materially increasing the overall length of the auger assembly in non-extended condition.

Another object of the present invention is to provide an extension unit for increasing the effective length of ice augers which is water-tight to minimize freezing and icing problems.

Other objects will become apparent as the description proceeds.

The invention is illustrated in the accompanying drawings in which the same numerals are used to identify corresponding parts and in which:

FIGURE 1 is a vertical elevation, partly in section, showing a conventional Swedish ice auger fitted with the extension unit according to the present invention;

FIGURE 2 is a transverse section on an enlarged scale on the line 2—2 of FIGURE 1 and in the direction of the arrows;

FIGURES 3, 4 and 5 are fragmentary elevations, partly in section and on an enlarged scale, showing modified forms of latching means; and FIGURE 6 is a further fragmentary elevation, partly in section and on an enlarged scale, showing the modified form of latching means of FIGURE 5 in unlatched position.

Referring now to the drawings, and particularly to FIGURE 1, there is shown a commercial Swedish (SNAAB) ice auger fitted with the extension unit according to the present invention. The operating means, indicated generally at 10, is in the form of a brace or bit stock having a swiveled head 11 at the top end for application of downward force along the longitudinal axis of the auger assembly. As is well known, the brace includes an offset section 12 spaced from, but generally parallel to, the longitudinal axis of the auger assembly. The offset section 12 is fitted with a freely rotatable handle portion by which rotary motion may be imparted to the auger assembly. The bottom shank end 14 of the operating means 10 is provided with an internally threaded sleeve 15.

The auger assembly also includes an elongated shank 16 carrying a cutting blade 17 suitably attached, as by bolts or rivets 18, to its bottom end. The upper end of shank 16 is provided with external threads 19 by which the shank 16 is normally secured to the brace 10 by engaging threaded sleeve 15. The auger is ordinarily disassembled for ease in carrying and storage by disengaging the threaded shank from the threaded sleeve of the brace means.

The extension unit, indicated generally at 20, is fitted between the brace means and elongated shank as hereinafter described. The extension unit 20 includes an elongated tubular housing 21 of strong rigid construction. Housing 21 is of square, hexagonal, octagonal or other non-circular cross section to facilitate application of torque by the housing to the auger shank. A solid block 22 is press fit and welded or otherwise tightly secured in the upper end of tubular housing 21. Where the extension unit is for use with an ice auger, this connection is tight enough to form an air and water-tight closure. Block 22 carries a central outwardly projecting threaded stub 23 adapted to engage threaded sleeve 15 carried by the brace means.

Block 22 and stub 23 may desirably be in the form of a bolt secured in the housing with the thread projecting from the end. Alternatively, block 22 may be in the form of a nut secured in the end of the housing into which a short length of threaded stock is screwed. In this latter instance, the threaded stock should be welded or otherwise secured to form a rigid air and water-tight connection (for ice augers) and the threaded stock should preferably not extend within the housing beyond the inner surface of block 22.

A bushing 24 is press fit and welded or otherwise secured in the bottom end of extension housing 21. For ice augers there is an air and water-tight fit between the bushing and housing. The center opening of bushing 24 receives the elongated auger shank 16 with a close fit, desirably with no more than 0.005 to 0.01 inch clearance, so as to be able to shear off any ice formed on the shank as it telescopes into the housing 21. The outside downwardly facing surface of the bushing surrounding the auger shank is desirably provided with a sharp right angle edge to facilitate removal of ice.

To insure against entry of air or water through the bushing, air and water-tight packing 25 is provided at the bottom end of the housing adjacent to the bushing to slidably engage the auger shank. Packing 25 is desirably in the form of a washer or series of washers formed from resilient absorbent material, such as felt, preferably impregnated with a low-temperature hydrophobic oil, such as silicone oil or the like, and desirably incorporated in a viscous anti-freeze such as glycerin or ethylene glycol. In addition to assisting in maintaining a tight fit between the auger shank and packing, the oil lubricates the shank and applies a water-repellent coating. Thus, although ice may form on the auger shank, it is not adherent and is easily sheared off by the sharp edged close-fitting bushing. Restraining means 26 press fit and welded or otherwise suitably secured to the housing holds down the packing immediately adjacent to the bushing. A flexible rubber or rubber-like washer having an opening slightly smaller than the diameter of shank 16 is desirably disposed between bushing 24 and packing 25, or between the packing and restraining means 26, to function as a squeegee to wipe water from the shank in the event the packing is permitted to dry out.

A retainer means 27 is enclosed within extension housing 21. Retainer 27 is freely slidable from one end of housing 21 to the other. It is of non-circular cross section corresponding to the inside cross section of housing 21 so that torque applied to the housing is transmitted to the retainer. Retainer 27 is centrally threaded to receive the threaded end 19 of auger shank 16. As best seen in FIGURES 3 and 4, the threads preferably do not extend all of the way through retainer 27 so as to provide a shoulder 28 which serves as a stop to prevent the end of shank 16 from extending beyond the upper edge of retainer 27 so as to interfere with locking of the retainer in the uppermost end of the tubular extension.

Stud 23, the threads in retainer 27 and the passage in bushing 24 are all in axial alignment. Thus, when the auger is assembled with the extension unit 20 positioned between the operating means 10 and the auger shank 16, the extension unit is in axial alignment with the auger shank. Then, the torque created by rotation of the brace means is transmitted directly to the extension unit and to the retainer 27 and auger shank carried by it so as to rotate the cutting blade 17. This is true whether the auger assembly is telescoped to its maximum extent with retainer 27 abutting block 22, or whether the auger assembly is extended to fullest extent with retainer 27 abutting the bushing end of the extension unit, or whether the retainer is at some intermediate point.

A plurality of latching or locking means are provided spaced along the length of the extension housing. Latching means should be provided at the top of the extension housing to lock the retainer and auger shank in fully telescoped (i.e. fully retracted) position and at the bottom of the extension housing to lock the retainer and auger shank in fully extended position. Preferably one or more intermediate latching means are provided so that the effective length of the auger may be increased progressively as the hole being cut becomes progressively deeper. A variety of different latching means may be employed, several of which are shown and described.

One form of latching means is shown in FIGURES 1 and 2. A narrow transversely extending plate 30 is disposed along one side of housing 21 held in position by means of a coil spring 31 attached to opposite ends of the plate, which is of length slightly greater than the width of housing 21, and extending around the housing. A pawl means in the form of a pin 32 is firmly secured to plate 30 and extends through an opening 33 in the wall of extension housing 21 into the path of retainer 27 in its movement from one end of the housing to the other. In FIGURE 2, pin 32 is shown bearing against the bottom surface of retainer 27 holding the retainer into abutment with block 22 when the auger is in its most retracted position. As shown, opening 33 in the housing wall is preferably offset from the center of the wall so as to permit use of a pin of greater length than might otherwise be possible in order to better insure firm and stable locking of the retainer in its retracted position.

In the case of an ice auger, where it is desired to keep the interior of the housing dry, opening 33 is desirably provided with a slight taper. Pin 32 is also desirably fitted with a corresponding taper so as to insure a tight fit in the opening. Desirably pin 32 is also provided with a thin coating 34 of rubber or rubberlike material to better insure a water-tight fit of pin 32 in opening 33.

When it is desired to unlatch retainer 27 so as to permit extension of the auger, plate 30 is grasped by one or both of the protruding ends and pulled against the tension of spring 31 to retract pin 32 far enough to permit retainer 27 to pass it. Then the pin is permitted to snap back into place to remain undisturbed until such time as the auger shank is again retracted into the extension housing.

When the retainer 27 is locked in some intermediate position between the ends of the extension housing, then it is necessary to secure the retainer against movement in either direction. This may be done by use of a single pawl means which engages an intermediate slot or hole in the retainer, as shown in FIGURE 1. Alternatively, a pair of spaced apart pawl means may be utilized to engage both the top and bottom surfaces of the retainer, one example of which is shown in FIGURE 3.

As shown in FIGURE 3, a plate 40 is positioned extending longitudinally along one side wall of extension housing 21. Plate 40 has a pair of inwardly extending projections 41 extending through a pair of longitudinally spaced apart transverse slots 42 in the extension housing wall. Projections 41 function as pawls and preferably are formed integral with plate 40. Projections 41 and slots 42 are spaced apart a distance just slightly in excess of the thickness of retainer 27 so as to permit the pawl members to engage the retainer with minimum slop. In this manner, the auger shank is latched in an intermediate position. In order to facilitate retraction of the pawl means, a bracket 43 is attached to the outer surface of plate 40 and provided with grasping means, such as ring 44.

In order to maintain the pawl means in their normal latching position and at the same time provide an air and water-tight seal for slots 42 through the housing wall, there is provided an elastic sleeve 45 which extends around the extension housing. Elastic sleeve 45 extends over plate 40 so as to urge plate 40 and pawl projections 41 resiliently into latching position. The overall length of sleeve 45 is sufficiently greater than the length of plate 40 to permit the ends of the sleeve to remain in tight hugging engagement against the extension housing wall even when the latching unit is retracted to unlatch the retainer. The projecting arms of bracket 43 extend through narrow slits in the elastic sleeve. The walls of the slits hug the surfaces of the bracket so as to maintain a tight seal.

Elastic sleeve 45 is formed from a natural or synthetic rubber material capable of good to excellent rebound under cold conditions and good elasticity. Exemplary materials include polyisoprene, butadiene-styrene, butadiene-acrylonitrile, chloroprene, polysulfide, silicone, polybutadiene fluorosilicone, ethylene propylene, and the like.

In FIGURE 4, there is shown a further alternative latching means along with an alternative construction for the bushing and packing assembly at the bottom end of the auger extension housing. According to this modified form of construction, bushing 24, packing washer 25 and restraining washer 26 are enclosed in a cap 50 having the same cross sectional configuration as the extension housing 21 and adapted to fit over the end of the housing and be welded or similarly secured, to form a tight closure in the case of ice augers. Restraining washer 26 is of a size such that it bears against the bottom end of tubular housing 21. Cap 50 has an opening 51 at least as large as the diameter of the bushing passage. The bushing is placed in the cap adjacent this opening. Packing washer 25 is installed on top of the bushing and restraining washer 26 on top of the packing. Then, before attachment of the cap to the housing 21, enough force is exerted by the end of the housing against washer 26 to compress the packing washer into tight engagement with the auger shank 16.

The hold-down locking means for latching the retainer 27 in its bottom-most position when the length of the auger is increased to its maximum extent according to this modified construction is in the form of a pin 52. Pin 52 extends through an opening 53 in the wall of the extension housing 21. Pin 52 is provided with a flange 54, preferably integral, which engages the outer wall of housing 21. Pin 52 has a head 55 to which is attached a swivel loop 56 which is adapted to receive a ring 57 in order to provide grasping means for retracting the latching pin.

The latching pin 52 is resiliently maintained in normal latching position by means of an elastic sleeve 45A, as already described. Elastic sleeve 45A engages the outer surface of flange 54 to normally urge pin 52 inwardly, while permitting it to be pulled outwardly against the tension of the elastic sleeve in order to permit passage of retainer 27. The elastic sleeve is of sufficient length so that its ends hug the extension housing wall 21 and cap 50 to maintain a tight seal even when the latching pin 52 is retracted. A small opening 58 is stretched to permit passage of head 55 and then tightly hugs the shank of pin 52 in air and water-tight engagement.

FIGURES 5 and 6 show a further alternative latching means. The hold-down locking means is shown with the auger in an intermediate extended position. The retainer 27 at the end of the shank 16 is provided with an intermediate slot or hole 60 in which a pawl in the form of pin 61 fits with a loose fit to engage and latch the retainer. Pin 61 is carried at one end of a flat elongated bent arm lever 62 and extends through a hole 63 in the tubular wall 21. The lever 62 has a handle portion 64 disposed at a slight angle between about 10 and 20 degrees relative to the rest of the lever. The point or elbow 65 at which the lever is bent to form the angularly disposed handle portion functions as a fulcrum to permit retraction of the pin upon depression of the handle portion of the lever.

The entire latching means is enclosed in a tight fitting rubber or other elastomeric sleeve or boot 45B which forms an air and water-tight seal over the latching means. As seen in FIGURE 5, the resiliency of the rubber sleeve normally urges pin 61 into latching engagement with the retainer with the flat pin-carrying portion of lever arm 62 in planar engagement with the outside wall of tubular housing 21 and with the handle portion 64 extending away from the housing wall, but completely enclosed by the rubber sleeve. When it is desired to unlatch the retainer, thumb pressure against the lever handle portion 64 causes the lever to rotate on fulcrum 65. As seen in FIGURE 6, by the time the handle portion is pressed into engagement with the side wall of the housing, the pin 61 is retracted against the resistance of the elastic sleeve sufficiently far to permit movement of the retainer 27 within the housing. Upon release of pressure against the handle portion 64, the resilience of the sleeve returns the latching pin to its original position.

This form of latching means is desirable because it does not necessitate any opening through the elatsic sleeve. If desired, the ends of the sleeve 45B may be adhesively sealed or secured by means of retaining bands or the like to further insure an air and water-tight seal.

It is apparent that many modifications and variations of this invention as hereinbefore set forth may be made without departing from the spirit and scope thereof. The specific embodiments described are given by way of example only and the invention is limited only by the terms of the appended claims.

I claim:
1. An extension unit for an auger having an elongated shank with cutting means at one end and operating means at the other, said extension unit comprising:
 (A) an elongated rigid tubular housing of non-circular cross-section;
 (B) fastening means rigidly secured to one end of said housing for attachment to the auger operating means;
 (C) bushing means secured at the opposite end of said housing for receiving and guiding the auger shank telescopically within the housing;
 (D) retainer means slidable within said housing between the ends thereof and rotatable therewith, said retainer means fitted for attachment to the end of the auger shank; and
 (E) a plurality of latching means spaced along the length of said housing to engage said retainer means and hold the same and the end of the auger shank rigidly at any of a plurality of operating positions spaced along the length of the housing.

2. An extension unit according to claim 1 further characterized in that the bottom end of said housing adjacent said bushing is fitted with lubricating packing to slidably engage the auger shank while maintaining an air and water-tight fit.

3. An extension unit according to claim 2 further characterized in that said packing is soaked with a low temperature hydrophobic oil to maintain an air and water-tight seal and apply a thin ice repellent coating on said auger shank as said shank is moved slidably through said packing.

4. An extension unit according to claim 3 further characterized in that said oil is a silicone oil.

5. An extension unit according to claim 1 further characterized in that the outside downwardly facing surface of said bushing surrounding said auger shank is provided with a sharp right angle edge whereby any ice formed on said shank is removed as said shank is telescoped within said housing.

6. An extension unit according to claim 1 further characterized in that said extension unit is separable, said auger shank is externally threaded and said retainer means is internally threaded to engage the externally threaded end of the auger shank.

7. An extension unit according to claim 6 further characterized in that stop means are provided to limit extent of engagement of said retainer means with the auger shank.

8. An extension unit according to claim 1 further characterized in that said latching means each comprise:
 (A) at least one retractable pawl extending through said housing wall and adapted to project into the path of said retainer means to engage a surface thereof;
 (B) grasping means external of said housing to permit manual retraction of said pawl; and (C) resilient means normally urging said pawl inwardly through the housing wall into latching position.

9. An extension unit according to claim 8 further characterized in that said resilient means comprises a tight-fitting elastomeric sleeve extending around said housing, the opposite ends of said sleeve engaging the wall of said housing in air and water-tight relationship and said sleeve engaging the grasping means for said pawl intermediate of the ends of the sleeve in air and water-tight relationship.

10. An extension unit according to claim 8 further characterized in that at least three latching means are provided spaced along the length of said housing including:
(A) an uppermost latching means adjacent the fastening means for attachment to the auger operating means and including at least one pawl adapted to engage the lowermost surface of said retainer means;
(B) a lowermost latching means adjacent the bushing and including at least one pawl adapted to engage the uppermost surface of said retainer means; and
(C) at least one intermediate latching means including at least one pawl adapted to engage said retainer means.

References Cited

UNITED STATES PATENTS

| | | | |
|---|---|---|---|
| 1,269,413 | 6/1918 | Finnigan | 145—64 |
| 2,682,414 | 6/1954 | Richardson | 145—64 X |
| 2,963,930 | 12/1960 | Clothier et al. | 145—64 X |
| 3,131,777 | 5/1964 | Snider | 175—18 |

HALL C. COE, *Primary Examiner.*

U.S. Cl. X.R.

145—64; 175—18; 287—58